US012547485B2

(12) United States Patent
Paracha et al.

(10) Patent No.: US 12,547,485 B2
(45) Date of Patent: Feb. 10, 2026

(54) DYNAMIC DATA CENTER EQUIPMENT ANALYSIS FOR SERVICE LEVEL AGREEMENT RECOMMENDATION

(71) Applicant: International Business Machines Corporation, Armonk, NY (US)

(72) Inventors: Muhammad Jawad Paracha, Karachi (PK); Soumitra Sarkar, Cary, NC (US); Yu Deng, Yorktown Heights, NY (US); Aleksandra Hosa, Long Island City, NY (US); John Alan Bivens, Ossining, NY (US); Ruchi Mahindru, Elmsford, NY (US); John Joseph Bird, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 18/234,967

(22) Filed: Aug. 17, 2023

(65) Prior Publication Data

US 2024/0403152 A1    Dec. 5, 2024

(30) Foreign Application Priority Data

May 31, 2023    (PK) .................................... 331/2023

(51) Int. Cl.
*G06F 11/00*        (2006.01)
*G06N 5/022*        (2023.01)
(Continued)

(52) U.S. Cl.
CPC ........... *G06F 11/004* (2013.01); *G06N 5/022* (2013.01); *G06N 7/01* (2023.01); *G06Q 30/018* (2013.01); *G06F 2201/81* (2013.01)

(58) Field of Classification Search
CPC .............. G06F 11/004; G06F 2201/81; G06F 16/24578; G06N 7/01; G06N 5/022; G06Q 30/018
See application file for complete search history.

(56) References Cited

U.S. PATENT DOCUMENTS

| 5,797,134 A | 8/1998 | McMillan et al. |
| 8,209,273 B2 * | 6/2012 | Goris ..................... G06Q 10/06 706/21 |

(Continued)

FOREIGN PATENT DOCUMENTS

CN         104142679 B       3/2017

OTHER PUBLICATIONS

U.S. Department of Education(Ed), Information Technology (IT) System Risk Assessment (RA) Standard, Jan. 31, 2022.

(Continued)

*Primary Examiner* — Loan L.T. Truong
(74) *Attorney, Agent, or Firm* — Garg Law Firm, PLLC; Rakesh Garg; Rakesh Roy

(57) ABSTRACT

Using a failure probability model, a probability of a failure in a first system within a specified time period is predicted. Using an impact model, an impact of the failure on a second system is predicted. Using a resilience model, an impact reduction of the failure is predicted. The probability, the impact, and the impact reduction are mapped into a recommended service level agreement category for the first system, the mapping performed using a classifier model.

20 Claims, 5 Drawing Sheets

(51) Int. Cl.
*G06N 7/01* (2023.01)
*G06Q 30/018* (2023.01)

(56) References Cited

U.S. PATENT DOCUMENTS

| | | | |
|---|---|---|---|
| 10,289,324 B2 | 5/2019 | Auvenshine et al. | |
| 10,901,841 B2 | 1/2021 | Auvenshine et al. | |
| 10,991,169 B2 | 4/2021 | Tonet et al. | |
| 11,561,849 B1* | 1/2023 | Kairali | G06F 11/079 |
| 12,332,755 B1* | 6/2025 | Paulraj | G06F 11/2257 |
| 12,388,256 B2* | 8/2025 | Abaas | H02J 3/0075 |
| 2006/0072708 A1* | 4/2006 | Warner | H04Q 11/045 379/22 |
| 2015/0033086 A1* | 1/2015 | Sasturkar | G06F 11/079 714/57 |
| 2016/0274949 A1* | 9/2016 | Cao | G06F 9/45558 |
| 2018/0373578 A1* | 12/2018 | Bridges | G06F 11/3604 |
| 2019/0182115 A1 | 6/2019 | Wilshinsky et al. | |
| 2020/0110395 A1* | 4/2020 | Le | G05B 23/0283 |
| 2020/0364635 A1 | 11/2020 | Bertoni Scarton et al. | |
| 2021/0004706 A1* | 1/2021 | Riddle | G06F 40/30 |
| 2021/0084059 A1 | 3/2021 | Sun et al. | |
| 2021/0174257 A1* | 6/2021 | Pothula | G06F 16/289 |
| 2022/0108262 A1* | 4/2022 | Cella | G05B 19/41885 |
| 2023/0061268 A1* | 3/2023 | Schardt | G06N 20/00 |
| 2023/0325871 A1* | 10/2023 | Ogallo | G06Q 30/0243 705/14.42 |
| 2024/0249158 A1* | 7/2024 | Narayanan | G06N 5/022 |
| 2024/0289594 A1* | 8/2024 | Keskin | G06N 3/045 |
| 2024/0394365 A1* | 11/2024 | Puhakainen | H04L 63/1433 |

OTHER PUBLICATIONS

Homeland Security, Information Technology Sector Baseline Risk Assessment, Aug. 2009.
Stoneburner et al., Risk Management Guide for Information Technology Systems, Jul. 2002.
Nikolic et al., Risk Assessment of Information Technology Systems, 2009.
Tal et al., New Method and Apparatus for Device Failure Risk Assessment, Oct. 31, 2007.
Carstens, Security Attestation Process, Aug. 10, 2010.
ip.com, Mechanism for Operational Risk Monitoring, System Testing Optimization and Root Cause Analysis for Complex Applications, Jul. 9, 2014.
ip.com, System and Method to Provide Cognitive Remediation Insights for Continuous Operations in Managing an Application with Mobile and Edge Devices which Can Experience Unplanned Outages Resulting in Loss of Business, Jan. 5, 2021.
Rosendo et al., A methodology to assess the availability of next-generation data centers, Apr. 15, 2019.
Solarwinds, Kiwi Syslog Server Free Edition, 2023, https://www.solarwinds.com/free-tools/kiwi-free-syslog-server.
List of all IBM related dockets, 2023.

* cited by examiner

DYNAMIC DATA CENTER EQUIPMENT ANALYSIS FOR SERVICE LEVEL AGREEMENT RECOMMENDATION

BACKGROUND

The present invention relates generally to a method, system, and computer program product for data center equipment risk evaluation. More particularly, the present invention relates to a method, system, and computer program product for dynamic data center equipment analysis for service level agreement recommendation.

A data center houses computer systems and associated components, such as telecommunications and storage systems. A data center typically includes additional equipment needed to operate the computer systems, such as heating and air conditioning (HVAC) equipment, systems supplying electrical power and backup power, and the like. A data center need not be a dedicated room or building, or include more than one system. For example, a data center serving a five-person office might include a router, file server, and backup storage, and be installed in a rack next to the office coffeemaker. Equipment housed in a data center is collectively referred to as data center equipment.

A service-level agreement (SLA) is a commitment between a service provider and a customer, which specifies services to be provided by the service provider to the customer in return for a specified payment. An SLA typically includes provisions such as a type of service to be provided (e.g., support of the computer systems in a data center, support of the HVAC systems in a data center), the service's desired performance level (e.g., the computer systems must be available at all times, or only during weekday business hours), how a performance levels is to be monitored (e.g., types of statistics, how frequently these statistics will be collected, how a customer can access these statistics), steps for reporting issues with the service (e.g., automated data center monitoring alerts a service provider immediately, a customer emails a specified mailbox), response and issue resolution time frame (e.g., a most-critical issue will be responded to within ten minutes and resolved within 4 hours, a least-critical issue will be responded to within one day and resolved within one week), and repercussions for the service provider not meeting its commitment. SLAs are typically agreed upon and paid for in advance of being needed, so that, for example, a customer suffering a failure in data center equipment already has provisions for fixing the failure in place.

SUMMARY

The illustrative embodiments provide a method, system, and computer program product. An embodiment includes a method that predicts, using a failure probability model, a probability of a failure in a first system within a specified time period. An embodiment predicts, using an impact model, an impact of the failure on a second system. An embodiment predicts, using a resilience model, an impact reduction of the failure. An embodiment maps the probability, the impact, and the impact reduction into a recommended service level agreement category for the first system, the mapping performed using a classifier model.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
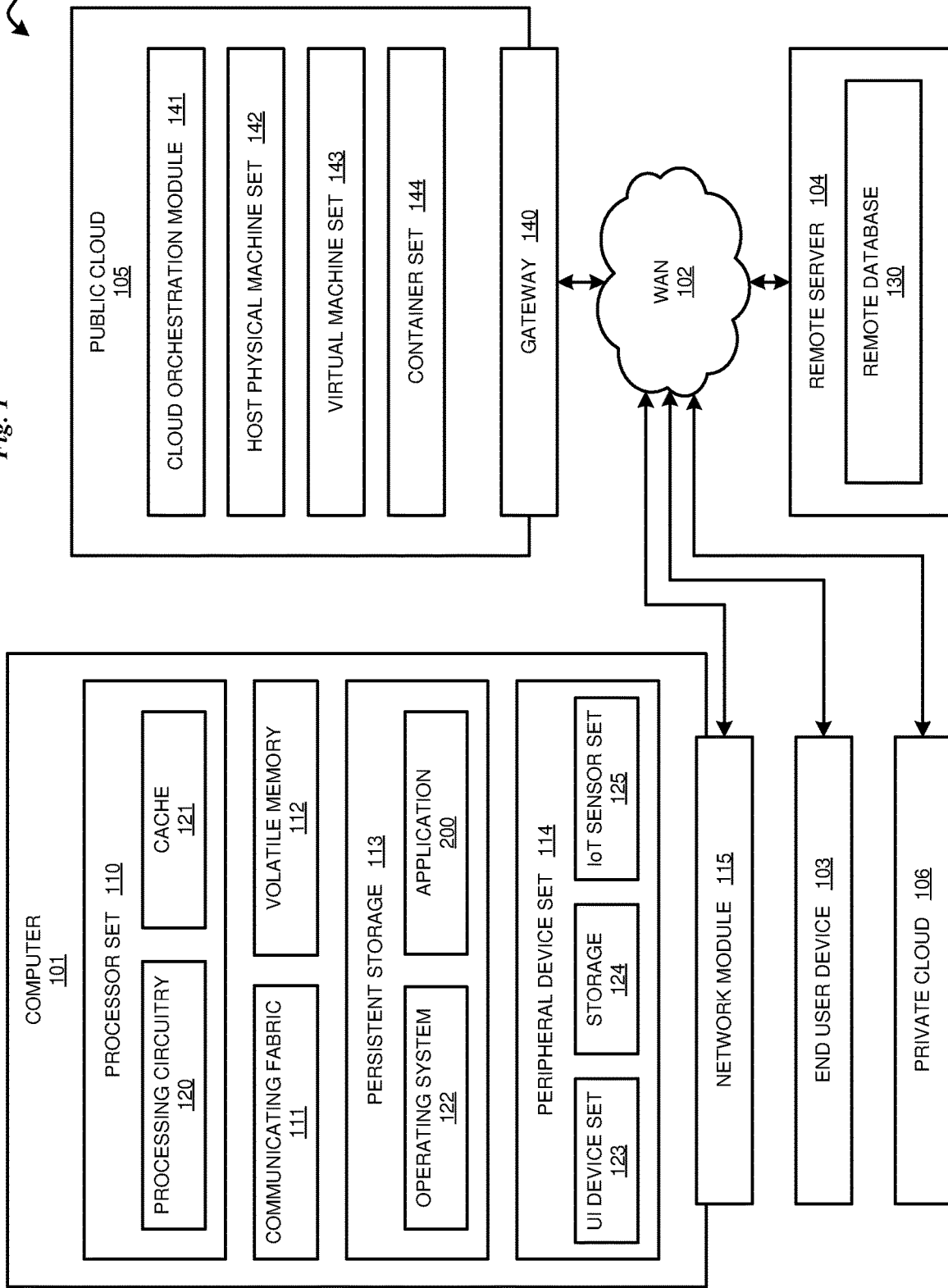
FIG. 1 depicts an example diagram of a data processing environments in which illustrative embodiments may be implemented.

The illustrative embodiments recognize that customers typically define SLA provisions manually based on the risk and impact of a system hardware failure and the importance of the system to a customer's business. However, while the importance of the system to a customer's business is relatively easy for a customer to estimate, the risk and impact of a system hardware failure is not. While mean-time-to-failure data for some components is published by a component's manufacturer, mean-time-to-failure data does not take into account other system components that could affect a component, a component usage rate, or environmental conditions that could affect a component's time to failure. As well, while techniques are presently available to predict a risk or probability of a component's or system's imminent failure using real-time data (e.g., a hard drive might show an increasing number of write errors just before failing completely), techniques for predicting an imminent failure are generally oriented towards the short term (e.g., the next few hours or days) and are not sufficiently predictive for use in evaluating a failure risk over the term of a service contract governed by SLA provisions (typically a year or more).

In addition, simply computing a risk of a component's failure does not account for the impact of a failure on other business operations or how backups and other risk mitigation techniques might affect the impact of a failure on other business operations. For example, configuring a storage system to use duplicate hard drives, in which every write transaction is written in parallel to both hard drives, minimizes the impact of a failure in one hard drive because data is still available on the duplicate. Maintaining replicas of entire storage systems consisting of thousands of disk drives, synchronously or asynchronously over relatively large distances, provides another level of resilience against a single system failure.

Further, because SLAs are typically agreed upon and paid for in advance of being needed, mis-predicting the SLA provisions that are actually needed can be costly. For example, a customer might pay for services that turn out to be unneeded, or a service provider might lose money if components require more frequent replacement than expected.

Thus, the illustrative embodiments recognize that there is a need for more accurate data center equipment evaluation than is currently available, taking into account factors other than the risk of a component failure, and evaluated over a time frame suitable for pricing SLA provisions. There is also a need for periodic data center equipment evaluation, to account for equipment changes, prediction inaccuracies, and other circumstances which could trigger a re-evaluation of existing SLA provisions.

The illustrative embodiments recognize that the presently available tools or solutions do not address these needs or provide adequate solutions for these needs. The illustrative embodiments used to describe the invention generally address and solve the above-described problems and other problems related to dynamic data center equipment analysis for service level agreement recommendation.

An embodiment can be implemented as a software application. The application implementing an embodiment can be configured as a modification of an existing data center equipment management or monitoring system, as a separate application that operates in conjunction with an existing data center equipment management or monitoring system, a standalone application, or some combination thereof.

Particularly, some illustrative embodiments provide a method that predicts a probability of a failure in a first system within a specified time period, predicts an impact of the failure on a second system, predicts an impact reduction of the failure, and maps the probability, the impact, and the impact reduction into a recommended service level agreement category for the first system, the mapping performed using a classifier model.

An embodiment receives data center data. One type of data center data is time-series data. Some non-limiting examples of data center time-series data are real-time or historical asset metrics of system components (e.g., CPU utilization rate, memory utilization rate, disk storage utilization rate), and data center metrics (e.g., energy usage, temperature), and the like. One non-limiting example of data center data that is not in time-series form is component metadata, typically supplied by a component vendor, such as mean-time-to-failure and end-of-life specifications for a component. Other non-limiting examples of data center data that are not in time-series form are component and system failure logs, faulty part prediction data output by a statistical model, and data center topology data. Data center topology data includes data of system configurations, such as whether a system has duplicate storage devices or a failover ability, and can be obtained using an automated configuration discovery technique, configuration management tool, or another presently available technique. As part of the data center data, an embodiment receives a criticality value. A criticality value is a customer's assessment of a business value of the data center equipment being evaluated. For example, the criticality value will be comparatively higher if a business cannot operate without the transaction processing performed by equipment in a data center being evaluated (e.g., a reservation and flight-tracking system for an airline operating worldwide), than if a business is only slightly affected by the same failure (e.g., a one-location physical retail store that can process sales using a backup method until service is restored). As part of the data center data, an embodiment receives a customer support maturity value. A customer support maturity value is an assessment of a customer's capability to support repair efforts after a failure. For example, if a customer uses automated notification of a part failure, the corresponding customer support maturity value might be higher than if an employee of the customer needs to drive to the data center, physically inspect all the equipment, diagnose the part failure, and email the service provider for a replacement.

An embodiment uses received data center data to predict a probability of a failure in a system in the data center, within a specified time period. The specified time period is the period for which SLA provisions are being evaluated—for example, a year or two years. To predict a probability of a failure, an embodiment uses a failure probability model.

One embodiment uses a machine learning based predictive maintenance model, a presently available technique, as the failure probability model. A machine learning based predictive maintenance model monitors real-time device data, identifies patterns in the data that lead to potential problems or failures, and uses the patterns to recommend device maintenance or replacement before a problem actually occurs. However, because a machine learning based predictive maintenance model relies on patterns in the data that lead to potential problems or failures within the next few days or weeks, such a model does not typically produce useful results over typical SLA contract periods (e.g., one or two years).

Another embodiment uses a proportional hazard model, also called a Cox hazard model, a presently available technique, as the failure probability model. A proportional hazard model relates the amount of time that passes before some event occurs to one or more covariates associated with that amount of time. In particular, the unique effect of a unit increase in a covariate is multiplicative with respect to the hazard rate. A probability of a failure in a system in the data center, within a specified time period, is one minus the survival probability for the specified time period.

The failure probability model is trained before use, using training data. In one embodiment, an instance of training data includes a set of features derived from the time series and non-time series data center data described herein, labelled based on the presence or absence of support tickets (i.e., customer requests for support from a service provider) in the time period of interest. A 'normal' training instance is one for which a support ticket was not created, while a 'problem' training instance is one for which a support ticket was created. Then, for a specific hardware system with given time series input, an embodiment counts the number of anomalies that occurred within a time period, and uses the resulting number of anomalies as input to the failure probability model. To convert failure logs into an input to the failure probability model, an embodiment divides the failure logs into a set of time periods, and counts the number of occurrences of a particular type of log event indicating an error condition. Other data center data is usable as-is as an input to the failure probability model. Other implementations of a failure probability model, using data center data, are also possible and contemplated within the scope of the illustrative embodiments.

An embodiment uses received data center data, including data center topology data, to predict an impact of a failure in a system in the data center on one or more other systems in the data center. In one embodiment, an impact of a failure is a number representing the count of other systems whose useful functionality (i.e., the ability to run a set of applications designated as business-critical) is affected by the source system's failure. (Note that the impact metric, a count, can be normalized to a number between 0 and 1 using a presently available normalization technique.) To calculate an impact of the failure on other systems, an embodiment uses an impact model. In one embodiment, the impact model includes a graph modelling a data center topology. In the graph, a node represents a system or other component in the data center, and an edge, connecting two nodes, represents a dependency between systems or other components represented by the nodes. Some non-limiting examples of a dependency are data provided by one system that is used in a functional computation by another system, and functionality provided by one system that another system depends on. The embodiment selects a node in the graph, and uses a presently available graph analysis techniques to determine all nodes in the graph that are connected to the selected node by one or more edges. Thus, if the selected node fails, all the nodes in the graph that are connected to the selected node are assumed to be affected by the failure. For example, consider a data center topology in which a storage system is connected via storage area networking (SAN) switches to one or more servers using the storage system. Thus, if the storage system fails, each server using that storage system could be affected. However, any SAN switches connecting servers to upstream storage systems are not affected by a failure of the storage system, and the impact model takes such domain knowledge into account.

An embodiment uses received data center data, including data center topology data, to predict an impact reduction of a failure predicted by the impact model. To predict an impact reduction, an embodiment uses a resilience model. Impact reduction takes into account resilience architecture and other failure-impact reduction techniques that may have been implemented in a data center. A data center topology that includes a full failover capability provides the most impact reduction from failures, while a data center configuration with less than full failover capability (e.g., periodic backups, additional equipment that can be configured quickly but is not already available, an on-site supply of frequently-used spare parts, an ability to route transactions to another data center, and the like) provides correspondingly less impact reduction. In one embodiment, an impact reduction is a range, e.g., between zero and one, denoting a factor by which the impact of a failure is reduced. Continuing the shared storage system example, if the storage system includes additional hard drives, and a failure resilience technique based on RAID (Redundant Array of Inexpensive Disks), a failure in one hard drive might only result in a small increase in response time for the servers using the storage system, and thus the impact reduction metric for that system might be 0.5. Other presently available resilience techniques might provide different impact reduction metrics.

An embodiment uses the probability of a failure of a system in the data center within a specified time period, the impact of that failure, the impact reduction of that failure, a criticality value of the system, and a customer support maturity value, to map the system into a recommended service level agreement category. A recommended service level agreement category includes a set of SLA features, ranked by how quickly the support to repair a data center failure is to be implemented. For example, an embodiment might use three recommended service level agreement categories, in which the lowest level category might be for support available Monday through Friday between the hours of 9 am and 5 pm local time, a middle level category might be for support available Monday through Friday between the hours of 9 am and 8 pm local time and 9-5 on Saturdays and Sundays, and the highest level category might be support available 24 hours a day, seven days a week.

To perform the mapping, an embodiment uses a multi-class classifier model. One or more of the probability of a failure in a system in the data center within a specified time period, the impact of that failure, the impact reduction of that failure, a criticality value, and a customer support maturity value are inputs to the model. From the model inputs, the classifier predicts, or outputs, one of N different SLA provision packages offered by a service provider. In other words, the classifier model maps model inputs into an SLA provision package in a plurality of SLA provision packages. To train the classifier model, an embodiment uses labelled training data in which, for each training instance, customer data identifies the state of a data center, contract data identifies current SLA provisions, and support ticket data identifies whether the customer had to pay extra to obtain a service not covered by the current SLA. If the customer had to pay extra, this data is labelled with the next higher SLA level that would not have resulted in paying extra. A customer override of the classifier model's SLA decision is also usable to train, or retrain, the classifier model. Training data is obtained from the same customer having a data center currently being evaluated, or another customer if the second customer consents to having its data shared.

An embodiment uses the recommended service level agreement category to assess the adequacy of a customer's current SLA provisions, or generate future SLA provisions for a customer. In particular, an embodiment compares SLA provisions in the recommended service level agreement category to the customer's current SLA provisions. If the customer's current SLA provisions fall into a lower SLA category than the recommended service level agreement category, the customer does not have adequate SLA provisions for the data center being evaluated, and thus an embodiment recommends upgrading the customer to the recommended service level agreement category. For example, a customer might be performing batch processing of a week's worth of data every Sunday, but the customer's current SLA provisions do not include Sunday support. Thus, an embodiment might recommend upgrading the customer to a higher service level agreement category that includes Sunday support. If the customer's current SLA provisions fall into a higher SLA category than the recommended service level agreement category, the customer has more than adequate SLA provisions for the data center being evaluated and might be overspending, and thus an embodiment recommends downgrading the customer to the recommended service level agreement category. For example, a customer might only require point-of-sale processing when a physical store is open, during weekday business hours, but the customer's current SLA provisions include support available 24 hours a day, seven days a week. Thus, an embodiment might recommend downgrading the customer to a lower service level agreement category that does not include the unneeded weekend support. An embodiment uses a user's acceptance, modification, or rejection of a recommended service level agreement category, as well as subsequent data center data, in further training and adjusting the models described herein. In one embodiment, a customer categorizes feedback as disagreement with the recommended service level agreement category, or overriding the recommended service level agreement category for reasons the models do not take into account.

An embodiment uses the recommended service level agreement category, or a user designation of a service level agreement category, to generate recommended changes to a system configuration or data center topology within a data center being evaluated. For example, an embodiment might determine that implementing a failover configuration might reduce the recommended service level agreement category one level, and the implementing the failover configuration is less expensive than the price difference between recommended service level agreement category—and thus implementing the failover configuration and reducing SLA provisions corresponding to the lower service level agreement category will save the customer money over an upcoming contract period.

An embodiment inserts SLA provisions corresponding to the recommended service level agreement category into an SLA contract template, thus generating a service level agreement ready for signature. For example, the contract template might specify that service provider support is to be available between the hours of _____ and _____, and the embodiment inserts the hours specified in the recommended service level agreement category into the blank spaces.

The manner of dynamic data center equipment analysis for service level agreement recommendation described herein is unavailable in the presently available methods in the technological field of endeavor pertaining to data center equipment management. A method of an embodiment described herein, when implemented to execute on a device or data processing system, comprises substantial advancement of the reliability, and hence functionality, of that device or data processing system in predicting a probability of a failure in a first system within a specified time period, predicting an impact of the failure on a second system, predicting an impact reduction of the failure, and mapping the probability, the impact, and the impact reduction into a recommended service level agreement category for the first system, the mapping performed using a classifier model.

The illustrative embodiments are described with respect to certain types of failures, failure impacts, failure impact reductions, models, data center data, labels, predictions, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a dynamic data center equipment analysis for service level agreement recommendation embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. Further, application 200 is usable to monitor data center equipment such as computer 101, end user device 103, remote server 104, or a computer in public cloud 105 or private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
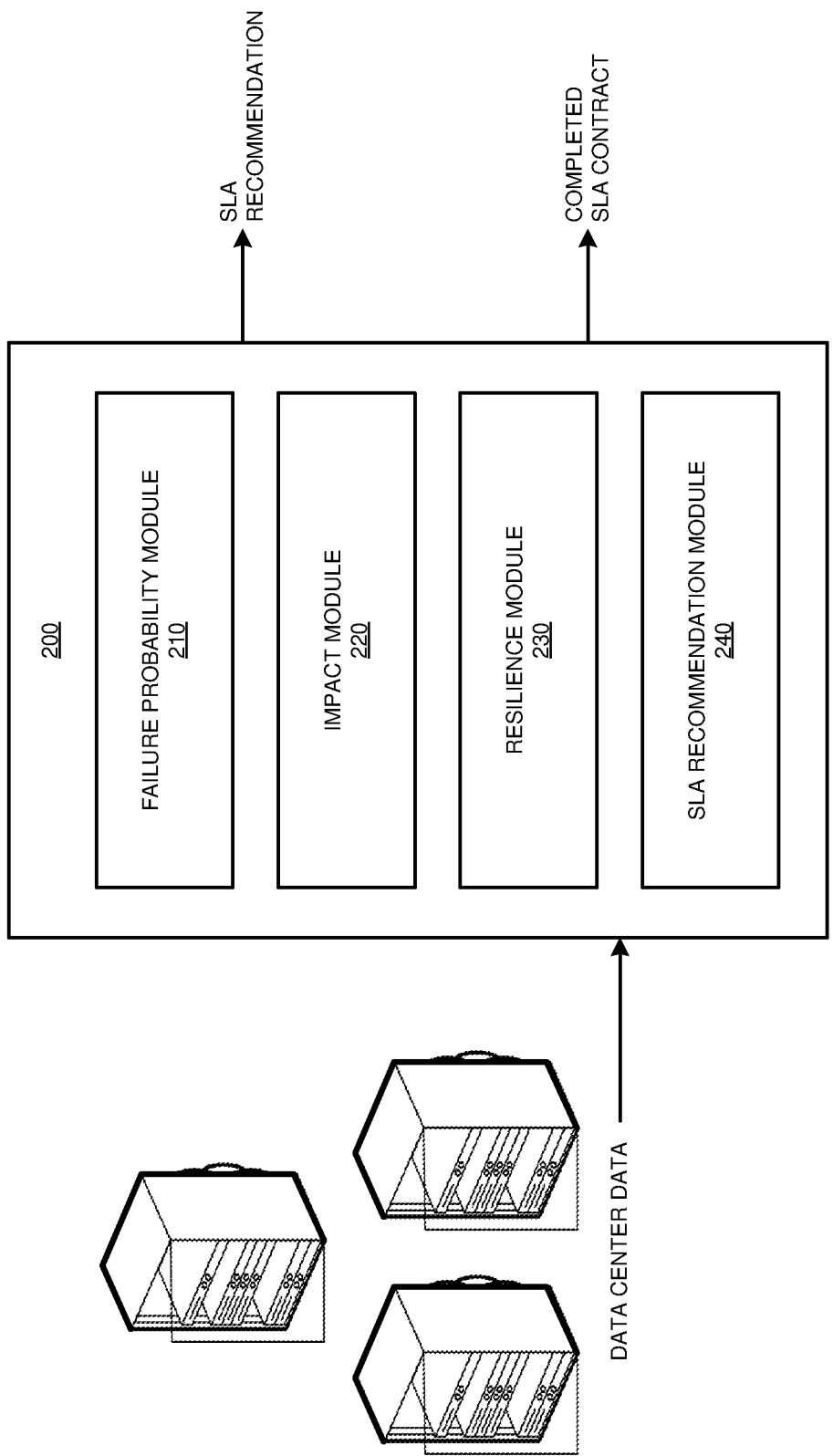
FIG. 2 depicts a block diagram of an example configuration for dynamic data center equipment analysis for service level agreement recommendation in accordance with an illustrative embodiment.

With reference to FIG. 2, this figure depicts a block diagram of an example configuration for dynamic data center equipment analysis for service level agreement recommendation in accordance with an illustrative embodiment. Application 200 is the same as application 200 in FIG. 1.

Application 200 receives data center data. One type of data center data is time-series data, such as real-time or historical asset metrics of system components (e.g., CPU utilization rate, memory utilization rate, disk storage utilization rate), log data, and data center metrics (e.g., energy usage, temperature), and the like. One non-limiting example of data center data that is not in time-series form is component metadata, typically supplied by a component vendor, such as mean-time-to-failure and end-of-life specifications for a component. Other non-limiting examples of data center data that are not in time-series form are component and system failure logs, faulty part prediction data output by a statistical model, and data center topology data. Data center topology data includes data of system configurations, such as whether a system has duplicate storage devices or a failover ability, and can be obtained using an automated configuration discovery technique, configuration management tool, or another presently available technique. As part of the data center data, application 200 receives a criticality value. A criticality value is a customer's or service provider's assessment of a business value of the data center equipment being evaluated. For example, the criticality value will be comparatively higher if a business cannot operate without the transaction processing performed by equipment in a data center being evaluated (e.g., a reservation and flight-tracking system for an airline operating worldwide), than if a business is only slightly affected by the same failure (e.g., a one-location physical retail store that can process sales using a backup method until service is restored). As part of the data center data, application 200 receives a customer support maturity value. A customer support maturity value is an assessment of a customer's capability to support repair efforts after a failure. For example, if a customer uses automated notification of a part failure, the corresponding customer support maturity value might be higher than if an employee of the customer needs to drive to the data center, physically inspect all the equipment, diagnose the part failure, and email the service provider for a replacement.

Failure probability module 210 uses received data center data to predict a probability of a failure in a system in the data center, within a specified time period. The specified time period is the period for which SLA provisions are being evaluated—for example, a year or two years. To predict a probability of a failure, module 210 uses a failure probability model.

One implementation of module 210 uses a machine learning based predictive maintenance model, a presently available technique, as the failure probability model. A machine learning based predictive maintenance model monitors real-time device data, identifies patterns in the data that lead to potential problems or failures, and uses the patterns to recommend device maintenance or replacement before a problem actually occurs. However, because a machine learning based predictive maintenance model relies on patterns in the data that lead to potential problems or failures within the next few days or weeks, such a model does not typically produce useful results over typical SLA contract terms (e.g., one or two years).

Another implementation of module 210 uses a proportional hazard model, also called a Cox hazard model, a presently available technique, as the failure probability model. A proportional hazard model relates the amount of time that passes before some event occurs to one or more covariates associated with that amount of time. In particular, the unique effect of a unit increase in a covariate is multiplicative with respect to the hazard rate. A probability of a failure in a system in the data center, within a specified time period, is one minus the survival probability for the specified time period.

The failure probability model is trained before use, using training data. In one implementation of module 210, an instance of training data includes a set of features derived from the time series and non-time series data center data described herein, labelled based on the presence or absence of support tickets i.e., customer requests for support from a service provider) in the time period of interest. A 'normal' training instance is one for which a support ticket was not created, while a 'problem' training instance is one for which a support ticket was created. Then, for a specific hardware system with given time series input, module 210 counts the number of anomalies that occurred within a time period, and uses the resulting number of anomalies as input to the failure probability model. To convert failure logs into an input to the failure probability model, module 210 divides the failure logs into a set of time periods, and counts the number of occurrences of a particular type of log event indicating an error condition. Other data center data is usable as-is as an input to the failure probability model. Other implementations of a failure probability model, using data center data, are also possible.

Impact module 220 uses received data center data, including data center topology data, to predict an impact of a failure in a system in the data center on one or more other systems in the data center. In one implementation of module 220, an impact of a failure is a number representing the count of other systems whose useful functionality (i.e., the ability to run a set of applications designated as business-critical) is affected by the source system's failure. (Note that the impact metric, a count, can be normalized to a number between 0 and 1 using a presently available normalization technique.) To calculate an impact of the failure on other systems, module 220 uses an impact model. In one implementation of module 220, the impact model includes a graph modelling a data center topology. In the graph, a node represents a system or other component in the data center, and an edge, connecting two nodes, represents a dependency between systems or other components represented by the nodes. Some non-limiting examples of a dependency are data provided by one system that is used in a functional computation by another system and functionality provided by one system that another system depends on. The implementation selects a node in the graph, and uses a presently available graph analysis technique to determine all nodes in the graph that are connected to the selected node by one or more edges. Thus, if the selected node fails, all the nodes in the graph that are connected to the selected node are assumed to be affected by the failure. For example, consider a data center topology in which a storage system is connected via storage area networking (SAN) switches to one or more servers using the storage system. Thus, if the storage system fails, each server using that storage system could be affected. However, any SAN switches connecting servers to upstream storage systems are not affected by a failure of the storage system, and the impact model takes such domain knowledge into account.

Resilience module 230 uses received data center data, including data center topology data, to predict an impact reduction of a failure predicted by the impact model. To predict an impact reduction, module 230 uses a resilience model. Impact reduction takes into account resilience architecture and other harm reduction techniques that may have been implemented in a data center. A data center topology that includes a full failover capability provides the most impact reduction from failures, while a data center configuration with less than full failover capability (e.g., periodic backups, additional equipment that can be configured quickly but is not already available, an on-site supply of frequently-used spare parts, an ability to route transactions to another data center, and the like) provides correspondingly less impact reduction. In one implementation of module 230, an impact reduction is a range, e.g., between zero and one, denoting a factor by which the impact of a failure is reduced. Continuing the shared storage system example, if the storage system includes duplicate hard drives, a failure in one hard drive might only result in a small increase in response time for the servers using the storage system, and thus the impact reduction metric for that system might be 0.5.

SLA recommendation module 240 uses the probability of a failure of a system in the data center within a specified time period, the impact of that failure, the impact reduction of that failure, a criticality value of the system, and a customer support maturity value, to map the system into a recommended service level agreement category. A recommended service level agreement category includes a set of SLA features, ranked by how quickly support to repair a data center failure is to be implemented. For example, an embodiment might use three recommended service level agreement categories, in which the lowest level category might be for support available Monday through Friday between the hours of 9 am and 5 pm local time, a middle level category might be for support available Monday through Friday between the hours of 9 am and 8 pm local time and 9-5 on Saturdays and Sundays, and the highest level category might be support available 24 hours a day, seven days a week.

To perform the mapping, module 240 uses a multi-class classifier model. One or more of the probability of a failure in a system in the data center, within a specified time period, the impact of that failure, the impact reduction of that failure, a criticality value, and a customer support maturity value are inputs to the model. From the model inputs, the classifier predicts, or outputs, one of N different SLA provision packages offered by a service provider. In other words, the classifier model maps model inputs into an SLA provision package in a plurality of SLA provision packages. To train the classifier model, module 240 uses labelled training data, in which, for each training instance, customer data identifies the state of a data center, contract data identifies current SLA provisions, and support ticket data identifies whether the customer had to pay extra to obtain a service not covered by the current SLA. If the customer had to pay extra, this data is labelled with the next higher SLA level that would not have resulted in paying extra. A customer override of the classifier model's SLA decision is also usable to train, or retrain, the classifier model. Training data is obtained from the same customer having a data center currently being evaluated, or another customer if the second customer consents to having its data shared.

Module 240 uses the recommended service level agreement category to assess the adequacy of a customer's current SLA provisions, or generate future SLA provisions for a customer. In particular, module 240 compares SLA provisions in the recommended service level agreement category to the customer's current SLA provisions. If the customer's current SLA provisions fall into a lower SLA category than the recommended service level agreement category, the customer does not have adequate SLA provisions for the data center being evaluated, and thus module 240 recommends upgrading the customer to the recommended service level agreement category. For example, a customer might be performing batch processing of a week's worth of data every Sunday, but the customer's current SLA provisions do not include Sunday support. Thus module 240 might recommend upgrading the customer to a higher service level agreement category that includes Sunday support. If the customer's current SLA provisions fall into a higher SLA category than the recommended service level agreement category, the customer has more than adequate SLA provisions for the data center being evaluated and might be overspending, and thus module 240 recommends downgrading the customer to the recommended service level agreement category. For example, a customer might only require point-of-sale processing when a physical store is open, during weekday business hours, but the customer's current SLA provisions include support available 24 hours a day, seven days a week. Thus, module 240 might recommend downgrading the customer to a lower service level agreement category that does not include the unneeded weekend support. Module 240 uses a user's acceptance, modification, or rejection of a recommended service level agreement category, as well as subsequent data center data, in further training and adjusting the models described herein. In one implementation of module 240, a customer categorizes feedback as disagreement with the recommended service level agreement category or overriding the recommended service level agreement category for reasons the models do not take into account.

Module 240 uses the recommended service level agreement category, or a user designation of a service level agreement category, to generate recommended changes to a system configuration or data center topology within a data center being evaluated. For example, module 240 might determine that implementing a failover configuration might reduce the recommended service level agreement category one level, and the implementing the failover configuration is less expensive than the price difference between recommended service level agreement category—and thus implementing the failover configuration and reducing SLA provisions corresponding to the lower service level agreement category will save the customer money over an upcoming contract period.

Module 240 inserts SLA provisions corresponding to the recommended service level agreement category into an SLA contract template, thus generating a service level agreement ready for signature. For example, the contract template might specify that service provider support is to be available between the hours of _____ and _____, and the embodiment inserts the hours specified in the recommended service level agreement category into the blank spaces.

Figure 3:
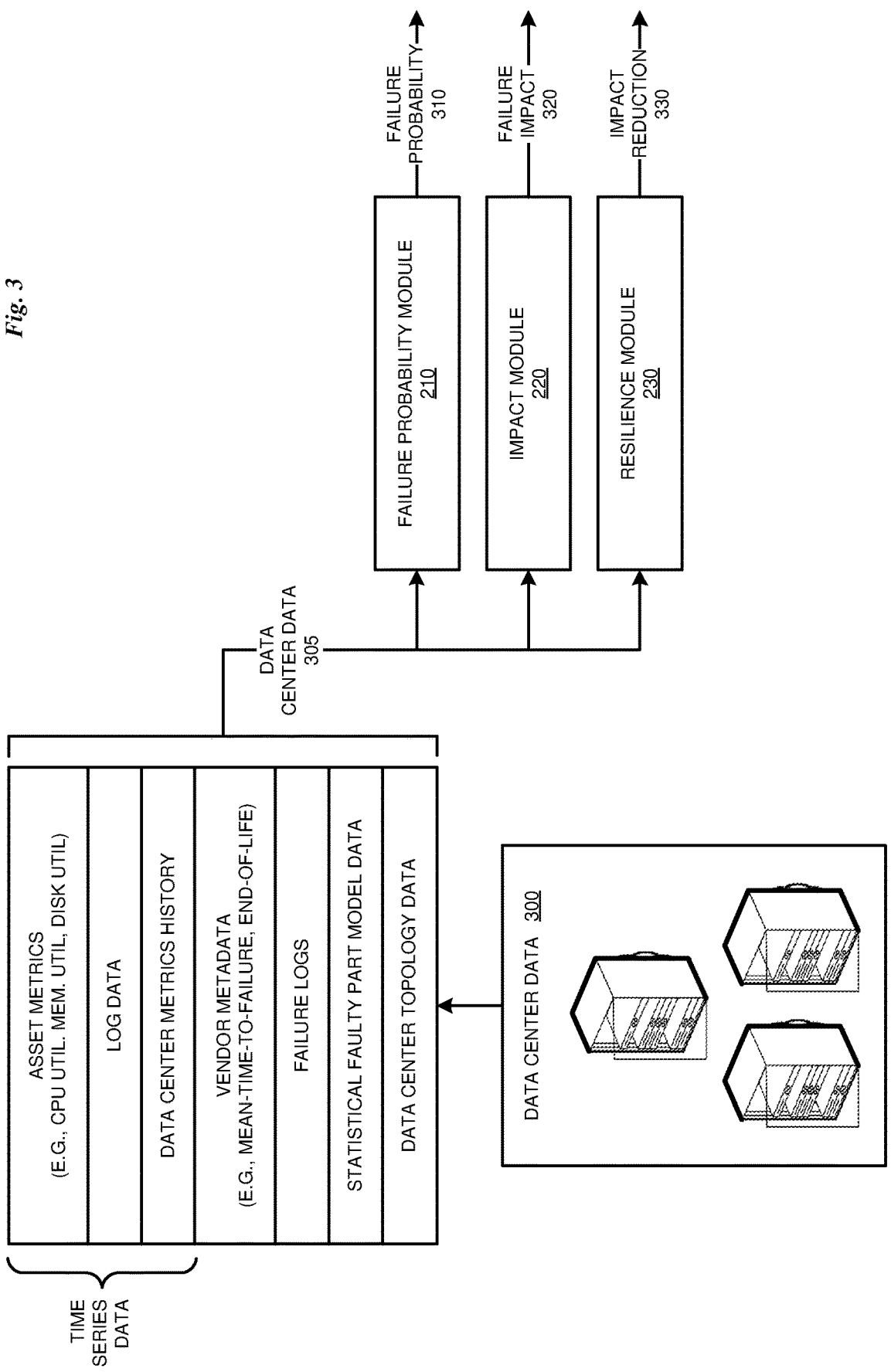
FIG. 3 depicts an example of dynamic data center equipment analysis for service level agreement recommendation in accordance with an illustrative embodiment.

With reference to FIG. 3, this figure depicts an example of dynamic data center equipment analysis for service level agreement recommendation in accordance with an illustrative embodiment. Failure probability module 210, impact module 220, and resilience module 230 are the same as failure probability module 210, impact module 220, and resilience module 230 in FIG. 2. The example can be executed using application 200 in FIG. 2.

Application 200 receives data center data 305 of data center 300. Data center data 305 includes time-series data, such as real-time or historical asset metrics of system components (e.g., CPU utilization rate, memory utilization rate, disk storage utilization rate), log data, and data center metrics (e.g., energy usage, temperature), and the like. Data center data 305 also includes non-time-series data, such as component metadata, typically supplied by a component vendor, such as mean-time-to-failure and end-of-life specifications for a component, component and system failure logs, faulty part prediction data output by a statistical model, and data center topology data. The data types depicted as part of data center 305 need not all be present, and modules 210, 220, and 230 use portions of data center 305 that are appropriate to their needs.

Failure probability module 210 uses data center data 305 to predict failure probability 310, a probability of a failure in a system in the data center, within a specified time period. Impact module 220 uses data center data 305, including data center topology data, to predict failure impact 320, an impact of a failure in a system in the data center on a second system in the data center. Resilience module 230 uses data center data 305, including data center topology data, to predict impact reduction 330, an impact reduction of a failure predicted by the impact model.

Figure 4:
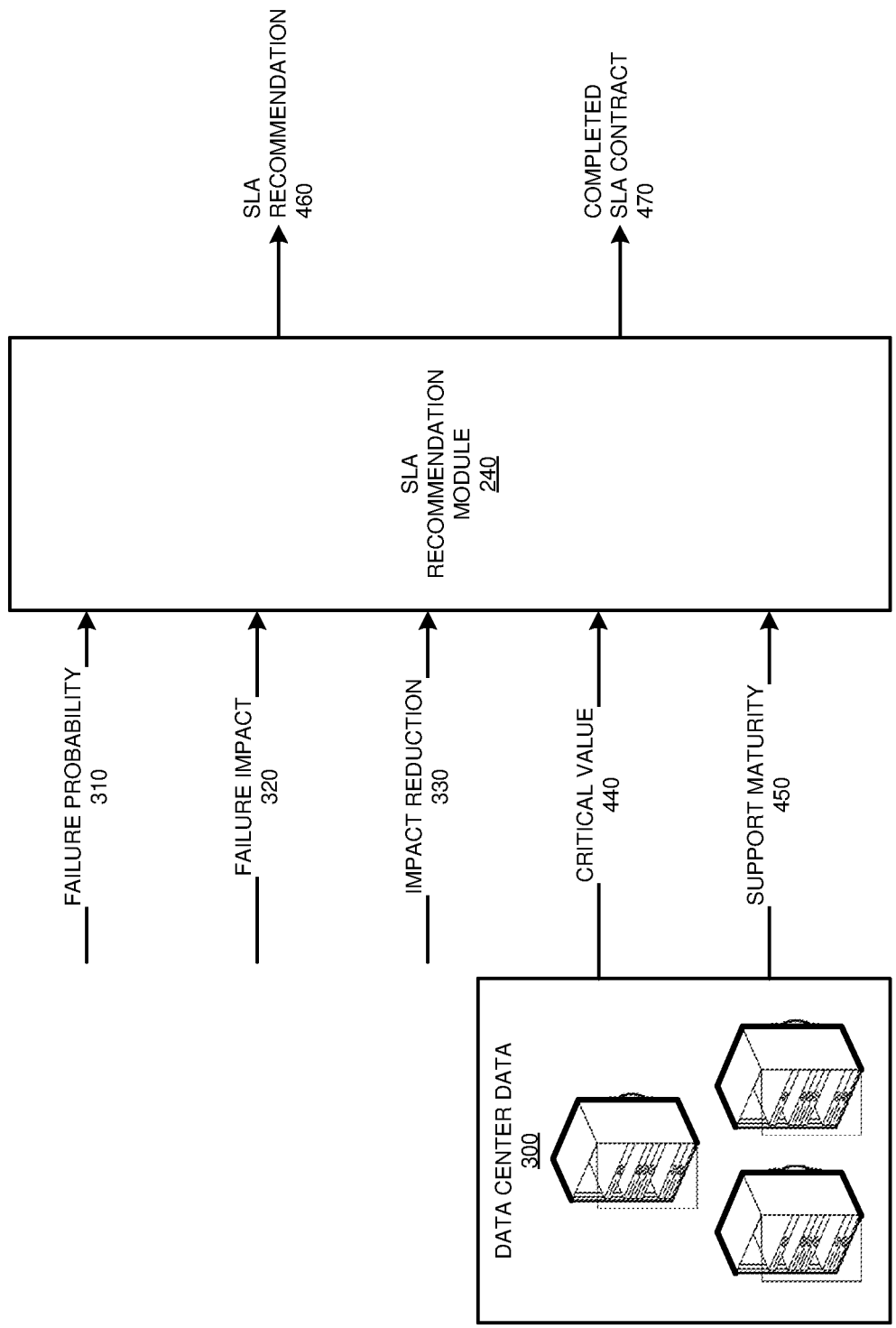
FIG. 4 depicts a continued example of dynamic data center equipment analysis for service level agreement recommendation in accordance with an illustrative embodiment.

With reference to FIG. 4, this figure depicts a continued example of dynamic data center equipment analysis for service level agreement recommendation in accordance with an illustrative embodiment. SLA recommendation module 240 is the same as SLA recommendation module 240 in FIG. 2. Data center 300, failure probability 310, failure impact 320, impact reduction 330 are the same as data center 300, failure probability 310, failure impact 320, impact reduction 330 in FIG. 3.

SLA recommendation module 240 uses failure probability 310, failure impact 320, impact reduction 330, criticality value 440, and support maturity 450 to classify systems in data center 300 into SLA recommendation 460, a recommended service level agreement category. Module 240 also inserts SLA provisions corresponding to the SLA recommendation 460 into an SLA contract template, thus generating completed SLA contract 470, ready for signature.

Figure 5:
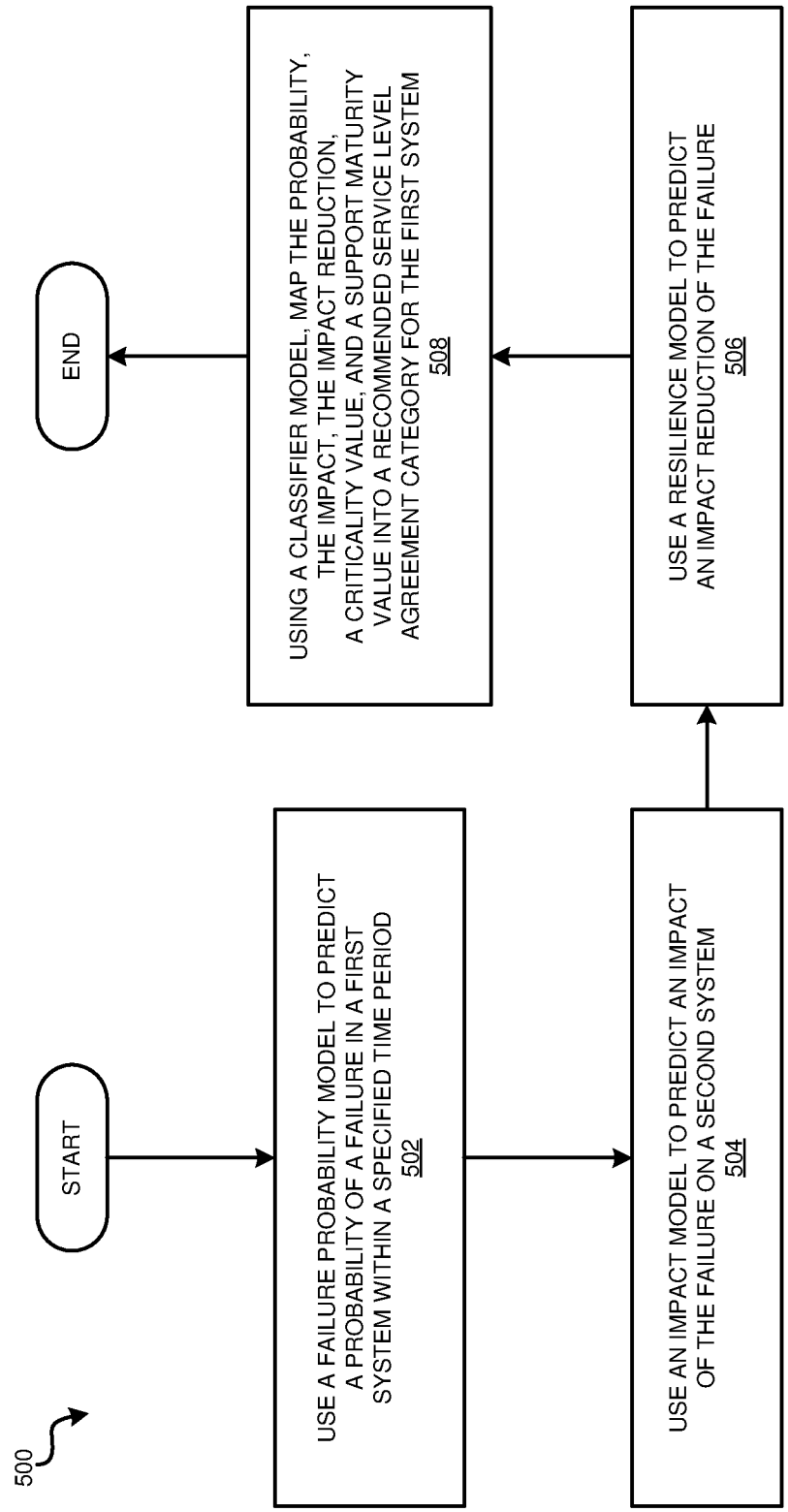
FIG. 5 depicts a flowchart of an example process for dynamic data center equipment analysis for service level agreement recommendation in accordance with an illustrative embodiment.

With reference to FIG. 5, this figure depicts a flowchart of an example process for dynamic data center equipment analysis for service level agreement recommendation in accordance with an illustrative embodiment. Process 500 can be implemented in application 200 in FIG. 2.

In block 502, the application uses a failure probability model to predict a probability of a failure in a first system within a specified time period. In block 504, the application uses an impact model to predict an impact of the failure on a second system. In block 506, the application uses a resilience model to predict an impact reduction of the failure. In block 508, the application, using a classifier model, maps the probability, the impact, the impact reduction, a criticality value, and a support maturity value into a recommended service level agreement category for the first system. Then the application ends.

Thus, a computer implemented method, system or apparatus, and computer program product are provided in the illustrative embodiments for dynamic data center equipment analysis for service level agreement recommendation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:
enhancing a failure recovery system of a data center comprising:
configuring a computational module of the failure recovery system to extract, from time-series data of a data center, a training dataset of the failure probability machine learning model, causing augmentation of the failure probability machine learning model by training the failure probability machine learning model with features and labels of the training dataset;
responsive to a time-series data of the data center, determining, by the computational module of the failure recovery system, an anomaly in the time-series data, predicting, by the computational module, using the failure probability machine learning model, a probability of a failure in a first system within a specified time period, in part on labels based on the presence or absence of support tickets according to the anomaly;
augmenting the time-series data of a data center with a data center topology, causing a computational impact module of the failure recovery system to predict, using an impact model, an impact of the failure on a second system;
predicting, using a resilience model, an impact reduction of the failure; and
mapping, by a computational recommendation module of the failure recovery system, the probability, the impact, and the impact reduction into a recommended service level agreement category comprising ranking a set of service level agreement features for the first system, the mapping performed using a classifier model.

2. The computer-implemented method of claim 1, wherein predicting the probability of the failure in the first system is performed using time-series data of a data center in which the first system is situated.

3. The computer-implemented method of claim 2, wherein a portion of the time-series data is labelled according to whether a support ticket was generated for the portion.

4. The computer-implemented method of claim 1, wherein predicting the probability of the failure in the first system is performed using failure log data of a data center in which the first system is situated.

5. The computer-implemented method of claim 1, wherein a set of inputs to the classifier model comprises a criticality value, the criticality value comprising an assessment of a business value of the first system.

6. The computer-implemented method of claim 1, wherein a set of inputs to the classifier model comprises a support maturity value, the support maturity value comprising an assessment of a customer capability to support a repair effort subsequent to an occurrence of the failure.

7. The computer-implemented method of claim 1, further comprising:

generating, by inserting data corresponding to the recommended service level agreement category into a service level agreement template, a service level agreement.

8. A computer program product comprising one or more computer readable storage medium, and program instructions collectively stored on the one or more computer readable storage medium, the program instructions executable by a processor to cause the processor to perform operations comprising:
enhancing a failure recovery system of a data center comprising:
configuring a computational module of the failure recovery system to extract, from time-series data of a data center, a training dataset of the failure probability machine learning model, causing augmentation of the failure probability machine learning model by training the failure probability machine learning model with features and labels of the training dataset;
responsive to a time-series data of the data center, determining, by the computational module of the failure recovery system, an anomaly in the time-series data, predicting, by the computational module, using the failure probability machine learning model, a probability of a failure in a first system within a specified time period, in part on labels based on the presence or absence of support tickets according to the anomaly;
augmenting the time-series data of a data center with a data center topology, causing a computational impact module of the failure recovery system to predict, using an impact model, an impact of the failure on a second system;
predicting, using a resilience model, an impact reduction of the failure; and
mapping, by a computational recommendation module of the failure recovery system, the probability, the impact, and the impact reduction into a recommended service level agreement category comprising ranking a set of service level agreement features for the first system, the mapping performed using a classifier model.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

11. The computer program product of claim 8, wherein predicting the probability of the failure in the first system is performed using time-series data of a data center in which the first system is situated.

12. The computer program product of claim 11, wherein a portion of the time-series data is labelled according to whether a support ticket was generated for the portion.

13. The computer program product of claim 8, wherein predicting the probability of the failure in the first system is performed using failure log data of a data center in which the first system is situated.

14. The computer program product of claim 8, wherein a set of inputs to the classifier model comprises a criticality value, the criticality value comprising an assessment of a business value of the first system.

15. The computer program product of claim 8, wherein a set of inputs to the classifier model comprises a support maturity value, the support maturity value comprising an assessment of a customer capability to support a repair effort subsequent to an occurrence of the failure.

16. The computer program product of claim 8, further comprising:
generating, by inserting data corresponding to the recommended service level agreement category into a service level agreement template, a service level agreement.

17. A computer system comprising a processor and one or more computer readable storage media, and program instructions collectively stored on the one or more computer readable storage media, the program instructions executable by the processor to cause the processor to perform operations comprising:
enhancing a failure recovery system of a data center comprising:
configuring a computational module of the failure recovery system to extract, from time-series data of a data center, a training dataset of the failure probability machine learning model, causing augmentation of the failure probability machine learning model by training the failure probability machine learning model with features and labels of the training dataset;
responsive to a time-series data of the data center, determining, by the computational module of the failure recovery system, an anomaly in the time-series data, predicting, by the computational module, using the failure probability machine learning model, a probability of a failure in a first system within a specified time period, in part on labels based on the presence or absence of support tickets according to the anomaly;
augmenting the time-series data of a data center with a data center topology, causing a computational impact module of the failure recovery system to predict, using an impact model, an impact of the failure on a second system;
predicting, using a resilience model, an impact reduction of the failure; and
mapping, by a computational recommendation module of the failure recovery system, the probability, the impact, and the impact reduction into a recommended service level agreement category comprising ranking a set of service level agreement features for the first system, the mapping performed using a classifier model.

18. The computer system of claim 17, wherein predicting the probability of the failure in the first system is performed using time-series data of a data center in which the first system is situated.

19. The computer system of claim 18, wherein a portion of the time-series data is labelled according to whether a support ticket was generated for the portion.

20. The computer system of claim 17, wherein predicting the probability of the failure in the first system is performed using failure log data of a data center in which the first system is situated.

* * * * *